United States Patent [19]

Nelson

[11] 4,264,047
[45] Apr. 28, 1981

[54] BRAKE AND FUEL LINE CLIP
[75] Inventor: John F. Nelson, New Lenox, Ill.
[73] Assignee: Illinois Tool Works Inc., Chicago, Ill.
[21] Appl. No.: 88,783
[22] Filed: Oct. 29, 1979
[51] Int. Cl.³ .............................................. F16L 3/08
[52] U.S. Cl. .................................. 248/73; 24/73 AP; 248/74 R.
[58] Field of Search ............... 248/74 R, 74 A, 74 B, 248/74 PB, 73, 316 B; 24/156 R, 257 R, 259 C, 16 PB, 73 CC, 73 SA, 73 PB, 81 CC, 73 AP; 211/89; 85/87

[56] References Cited

U.S. PATENT DOCUMENTS

| 3,126,185 | 3/1964 | Christman | 248/74 PB |
| 3,421,187 | 1/1969 | Ryder | 24/81 CC |
| 3,899,149 | 8/1975 | Schneider | 248/75 |
| 3,954,238 | 5/1976 | Nivet | 248/68 |
| 3,991,960 | 11/1976 | Tanaka | 248/68 R |
| 4,061,299 | 12/1977 | Kurosaki | 248/73 |

FOREIGN PATENT DOCUMENTS

| 2442414 | 3/1976 | Fed. Rep. of Germany | 248/73 |
| 1355795 | 2/1964 | France | 24/73 SA |
| 2270702 | 12/1975 | France | 248/73 |
| 7309522 | 1/1975 | Netherlands | 248/73 |
| 1022820 | 3/1966 | United Kingdom | 248/73 |

Primary Examiner—J. Franklin Foss
Attorney, Agent, or Firm—Thomas W. Buckman; Jack R. Halvorsen

[57] ABSTRACT

A molded one-piece combination safety clamp and fastener apparatus is provided for securing a generally tubular member to an apertured mounting surface. The apparatus includes a collar portion having an inner wall surface for receiving and maintaining substantially without play a tubular shaped element. A clamping portion of the apparatus is integrally hinged to the collar portion and is moveable into engagement with the collar portion for clamping the tubular element therebetween. Cooperating locking structures are associated with the collar and clamping portions for positively locking the collar and clamping portions into engagement about the element. An integral fastener structure having a plurality of coaxially extending shank sections for insertion through an aperture of the mounting surface has a passageway and a pin extending axially therein. The pin element is positioned with respect to the clamping portion to cause the fastener to be positively retained, within the mounting surface aperture upon the hinged movement and engagement of the clamping portion with the collar portion.

6 Claims, 7 Drawing Figures

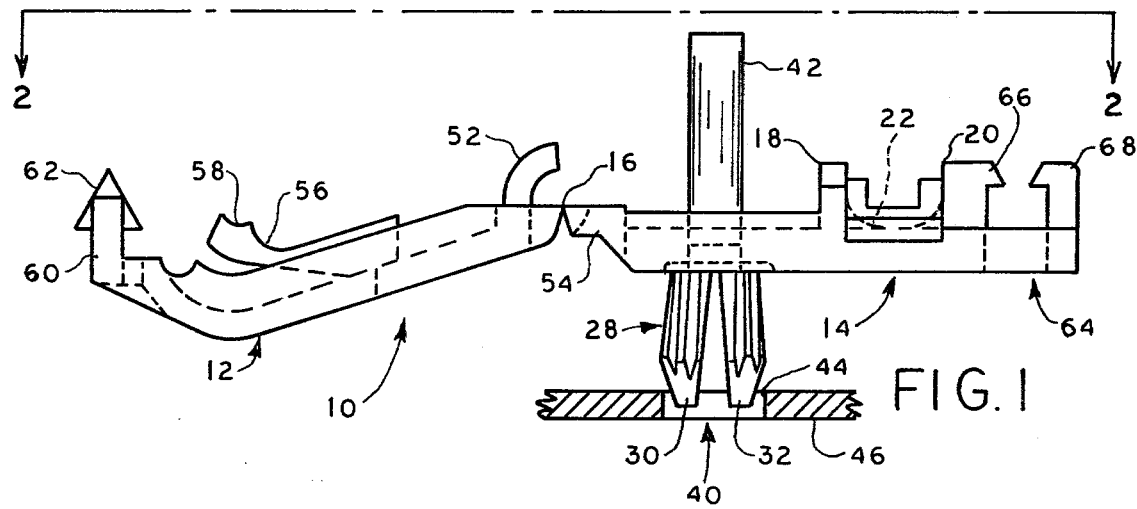
FIG. 1
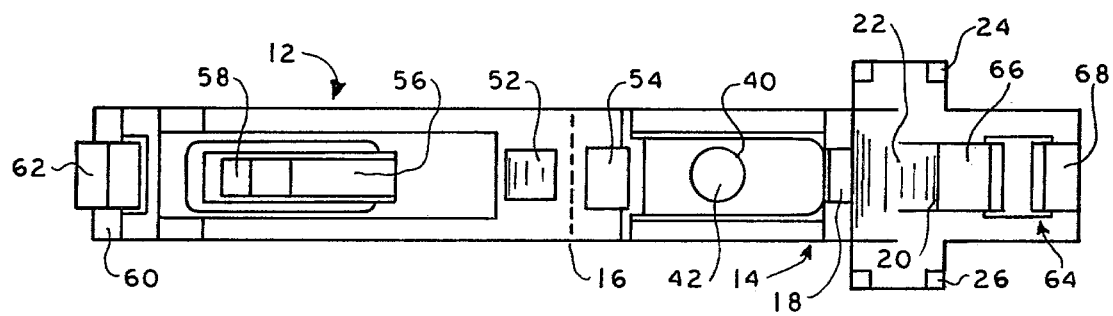
FIG. 2
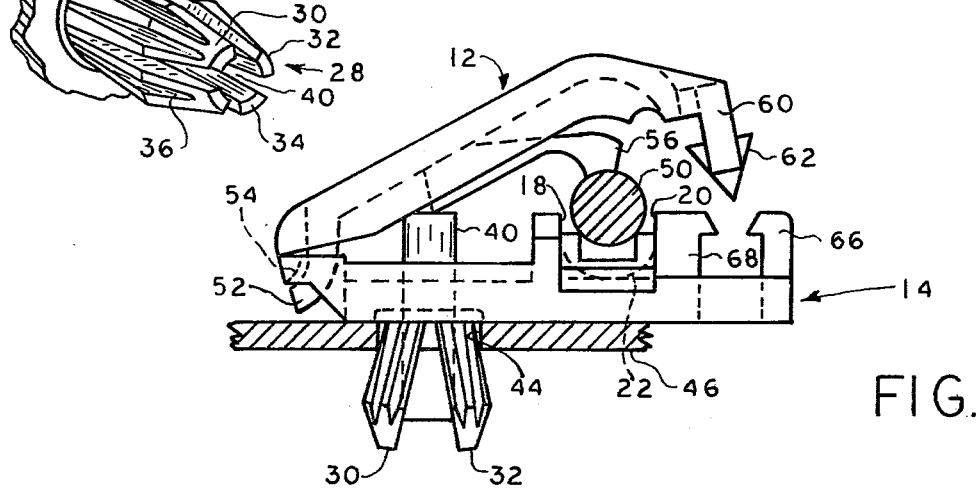
FIG. 3
FIG. 4

BRAKE AND FUEL LINE CLIP

BACKGROUND OF THE INVENTION

This invention is directed to a novel combined safety clamp and fastener device, and more particularly to such a device for securing conduits such as piping, sheaths and cables of various kinds to fixed members such as apertured partitions or walls, and provided with means for positively holding and maintaining the conduits or the like against substantially any movement with respect thereto.

As is well-known, motor vehicles have numerous conduits whose function is to supply various parts of the vehicle with pressurized fluid, or mechanical or electrical energy. For safety reasons, it is desirable for such tubing or cables to be fixed substantially immobile to vehicle walls or surfaces by means of suitable support or clamp. Such a support or clamp must not only hold the tubing or cable substantially immobile, but must further be positively secured to the wall or other surface so as to avoid the inadvertent removal thereof due to vibration or other forces encountered when the vehicle is in operation. Prior art supports in the form of securing collars for receiving such tubing or cables by merely clipping thereon have heretofore not adequately met either of these requirements.

Further in this regard, it is also desirable that the support or clamp positively hold the tubing or cable securely clamped therein, the clamping mechanism being highly resistant to release thereof due to vibration, wear or other forces exerted thereon not only when the vehicle is in operation, but also accidental forces applied thereto, for example, when a mechanic is working on the vehicle.

Furthermore, in view of the many shapes and sizes of such tubing, cables or the like, it is desirable in some cases to provide a single clamp structure which is suitable for accommodating a broad variety of sizes and/or shapes of such tubing, cables or the like.

OBJECTS AND SUMMARY OF THE INVENTION

Accordingly, it is a general object of the present invention to provide a new and improved safety clamp and fastener assembly for use in an automotive vehicle or the like.

A more specific object is to provide a combined safety clamp and fastener in which the clamp portion and fastener portion cooperate with each other to insure a secure mounting thereof to a wall or other surface so as to be substantially resistant to removal due to vibration or other forces applied thereto while in service.

A related object is to provide a combined assembly of the foregoing type wherein the clamp part includes a novel and improved clasping or locking mechanism, which is substantially impervious to dislodging forces, once secured.

A related object is to provide a combined assembly of the foregoing type wherein the clamp includes means for accommodating a predetermined range of sizes and shapes of tubes, cables or similar members.

In accordance with one aspect of the invention there is provided a combined clamp and fastener apparatus for securing to an apertured mounting surface an element of a predetermined shape, and comprising means defining a seat with an inner wall surface for receiving said element, clamping means integrally and hingedly coupled to said seat to form an integral piece therewith and hingedly movable into engagement with said element when seated in said seat for retaining said element, cooperating locking means associated with said seat and said clamping means respectively for positively locking the seat and clamping means in engagement with said element, fastener means integrally formed with said apparatus and comprising a plurality of coaxially extending shank sections for insertion through an aperture of the mounting surface and having a passageway extending axially therein and partially defined by the inner surfaces of said shank sections, and a pin element insertable in said passageway for expanding said shank section upon insertion thereof through said aperture for positively securing the clamp and fastener apparatus to the surface, said pin element being positioned with respect to said clamping means so as to be positively retained in said passageway thereby upon engagement of said clamping means with said element when seated in the seat.

In accordance with another aspect of the invention, the clamping means is further provided with a resilient retaining member biased into engagement against the seated and retained element for securing said element against rotation and longitudinal movement relative to the seat, said resilint retaining member being resiliently deflectable for accommodating different elements throughout a predetermined range of girths.

BRIEF DESCRIPTION OF THE DRAWINGS

Other objects, features and advantages of the invention will become more readily apparent upon reading the following detailed description of the illustrated embodiments together with the accompanying drawings, wherein:

FIG. 1 is a side elevation of one embodiment of a combined clamp and fastener device in accordance with the present invention;

FIG. 2 is a view taken generally along the line 2—2 of FIG. 1;

FIG. 3 is a perspective view of a fastener portion of the device of FIG. 1 and FIG. 2;

FIG. 4 is a side elevation of the device of FIG. 1 mounted on a receiving surface and mounting a cable or the like, just prior to securing thereof;

DETAILED DESCRIPTION OF THE ILLUSTRATED EMBODIMENT

Figure 5:
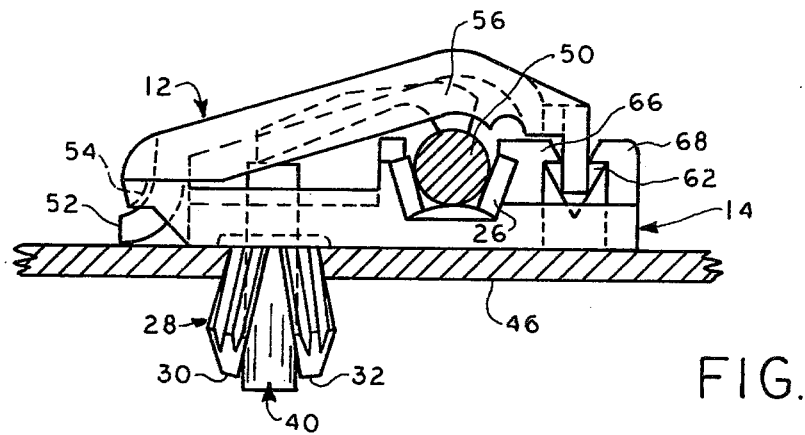
FIG. 5 is a view similar to FIG. 4 illustrating the clamping device of the invention in its fully secured position.

Reference is initially invited to FIG. 1 wherein there is seen a preferred embodiment of the combined clamp and fastener device of the invention, designated generally by the reference numeral 10. Referring also to FIG. 2, which is a view taken generally along the line 2—2 of FIG. 1, the device 10 will be seen to comprise a one-piece molded member, and is preferably formed of plastic or of other like material. Furthermore, the molded member 10 comprises two major functional portions or sections designated generally by the respective reference numerals 12 and 14 and joined by a hinged connection 16. The portion 12 will be hereinafter referred to as the clamping portion or section while the portion 14 will be hereinafter referred to as the seat or collar portion or section.

Upon closer inspection, the seat or collar portion or section 14 will be seen to include a seat or collar formed by a pair of facing walls 18, 20 which define between them a gap or trough 22 of similar size or dimension to the outer surface of the tubing sheath or cable which it is designed to receive and support. As best seen in FIG. 2 a pair of further cooperating supporting arms or members 24, 26 are also formed laterally outwardly of the trough or gap 22 to lend further support to the tubing, sheath or cable which is to be received thereby.

To one side of the seat and protruding from the opposite side or surface of the collar portion 14 therefrom, there is formed a fastener head or member designated generally by the reference numeral 28. This fastener member or portion 28, as best seen in FIG. 3 comprises an expandable shank provided by a plurality of coaxially extending shank sections or segments 30, 32, 34, 36 separated from each other by generally coaxially extending slots therebetween. The trailing ends of these shank sections merge with and are integrally joined to the bottom surface of the collar section 14, as viewed in FIG. 1.

A central bore 40 extends axially through the expandable shank provided by the sections 30, 32, 34, and 36 and also completely through the collar section 14. This bore 40 receives a drive pin 42, which is illustrated in FIG. 1 prior to entering the portion of the bore 40 formed by the shank sections 30, 32, 34, and 36. Accordingly, the central bore 40 is initially formed with a substantially uniform diameter, somewhat smaller than that of the pin 42, throughout the shank sections. Also, the shank sections are provided with surface portions which initially flare outwardly as they emanate from the surface of the collar portion 14 to a junction with oppositely tapered or beveled, entering end portions. The shank sections are so designed for mounting through an aperture 44 of a mounting surface or workpiece or structure 46.

In other respects, this fastener head 28 and associated pin 42 are substantially of the type described in U.S. Pat. No. 3,203,304, particularly with reference to the embodiments thereof discussed with reference to FIGS. 22 and 23 of that patent, and need not be discussed further herein. Suffice it to say, that upon entry of the expandable head portion 28 through the aperture 44 of the work structure or mounting surface 46, the pin 42 may be driven downwardly (as viewed in FIGS. 1 and 3) therethrough to effect expansion of the shank sections or portions 30, 32, 34, and 36. As discussed above, the inner diameter of the portion of the bore 40 formed by the expandable shank portions 30, 32, 34, and 36 is somewhat smaller than the outer diameter of the pin 42. Accordingly, driving of the pin 42 therethrough will cause this outward expansion of these expandable shank sections or portions 30, 32, 34, and 36.

Consequently, the outwardly expanded shank portions will firmly engage the aperture 44 thus securing the device 10 firmly thereto and to the work surface 46.

Referring now to FIGS. 4 and 5, and in accordance with an important feature of the invention, hinged movement of the clamping member or portion 12 with respect to the collar section or portion 14 so as to engage a tubing, sheath or cable element 50 therebetween also results in positioning of clamping member 12 over the aperture containing the pin 42 so as to positively retain the pin member in its fully driven or advanced position with respect to the bore 40 through the expandable head portion 28.

Advantageously, the relatively weak, molded hinged connection 16 is further enhanced, upon relative hinged movement of the sections 12 and 14, by the provision of a hooklike member or portion 52 formed on the section 12 which engages with a complementary slot or receptacle 54 formed for this purpose in the other section 14. The relative location of these complementary locking parts 52 and 54 may of course be reversed as to the two sections 12 and 14. Accordingly, upon engagement of the sections 12 and 14 as shown in FIGS. 4 and 5, this engagement between hook 52 and receptacle 54 enhances the structural integrity of the hinged joint or connection 16.

Referring now more particularly to the clamping section or portion 12 it will be seen to further include a resiliently formed retaining member or cam 56 which advantageously engages with the retained element 50, to further enhance the retention thereof in proper position with respect to the trough or gap 22 of the collar portion 14. In the illustrated embodiment, this resilient retaining member or finger 56 is further provided with a curvature at its surface 58 which comes into engagement with the retained element 50 to enhance the contact therebetween. Advantageously, as this element 56 is resilient in nature, as seen by the securing thereof only at an end remote from its engagement with its retained element 50, the device 10 is capable of accommodating retained elements 50 over a relatively broad range of diameters or girths.

As a further feature of the present invention, the sections or portions 12 and 14 are further provided with a novel locking mechanism. Referring to the clamping portion or section 12, a generally outwardly extending or protruding finger or neck portion 60 mounts a wedged-shaped or triangular (in cross-section) portion or member 62. Cooperatively, on the collar portion 14 there is formed a receptacle for this locking member and designated generally by the reference numeral 64. This receptacle 64 is defined by a pair of resiliently mounted outwardly extending arms 66 and 68, each of which is provided with a facing, inwardly extending shoulder portion. As seen with reference to FIGS. 4 and 5, upon hinged relative movement of the sections 12 and 14, the wedge member 62 engages the complementarily formed surfaces of the shoulder portions on the arms 66 and 68, forcing the resilient arms apart somewhat to accommodate the advancing wedge 62. Upon advancement of the widest or trailing portion of wedge member 62 past the shoulder portions, the arms 66 and 68 advantageously resiliently return to their initial positions, thereby securely locking into engagement with and substantially preventing subsequent removal of the wedge 62.

Figure 6:
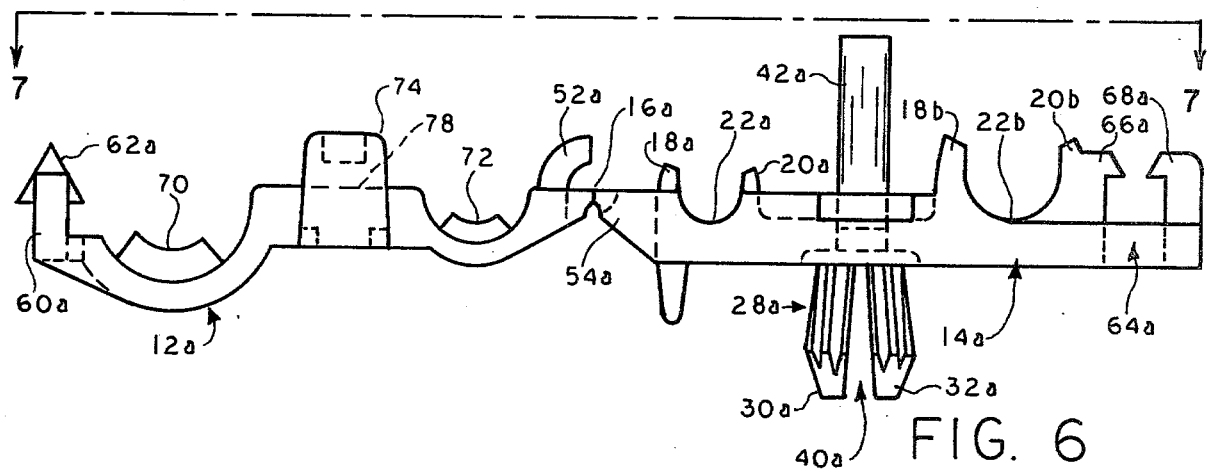
FIG. 6 is a side elevation of a second embodiment of a combined clamp and fastener device embodying features of the invention.
Figure 7:
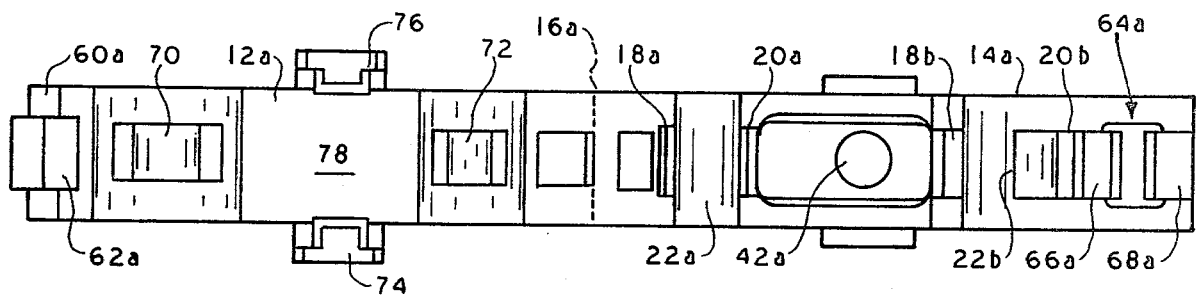
FIG. 7 is a view taken generally along the line 7—7 of FIG. 6.

Referring briefly to FIGS. 6 and 7, a second embodiment of a safety clamp and fastener device in accordance with the principles of the invention is illustrated. Similar reference numerals are used throughout together with the letter a to designate elements and components similar to those described above with reference to the embodiment illustrated in FIGS. 1 through 5, inclusive.

It will be noted that the embodiment illustrated in FIGS. 6 and 7 includes two pairs of arms 18a, 18b, and 20a, 20b, forming a pair of troughs or gaps 22a, 22b for receiving a pair of tubes, wires, cables or similar elements to be supported and retained therein. Moreover, the resilient retaining member of finger 56 is not utilized in this embodiment, the retaining function thereof being assumed by a pair of cams 70, 72, which are fixed and not resiliently moveable. The other portions and sections of the embodiment of FIGS. 6 and 7 are essentially identical to that of the embodiment discussed with reference to FIGS. 1 through 5, inclusive, above. It will be noted however, that a pair of protruding side wall portions 74, 76 are formed intermediate the cams 70 and 72 on the clamp portion of section 12a. The side wall portions 74, 76 and the surface defined therebetween are arranged and positioned so as to surroundingly engage the top portion of the pin 42a upon relative hinged movement of the sections 12a and 14a. Thus retention of the pin 42a in substantially its fully driven condition with respect of fastener head 28a is assured in the embodiment of FIGS. 6 and 7.

While the invention has been described hereinabove with reference to preferred embodiments, the invention is not limited thereto. On the contrary, various changes, modifications or alternatives may become apparent to those skilled in the art upon reading the foregoing descriptions. Accordingly, the present invention is intended to embrace all such changes, modifications and alternatives insofar as they fall within the spirit and scope of the appended claims.

The invention is claimed as follows:

1. A molded one-piece combination safety clamp and fastener apparatus for securing to an apertured mounting surface at least one element of a predetermined shape, and comprising means defining a seat with an inner wall surface for receiving said element, clamping means integrally and hingedly coupled with said seat to form an integral piece therewith and hingedly movable into engagement with said element when said element is seated in said seat for clampingly engaging said element, cooperating locking means associated with said seat and said clamping means respectively for positively locking the seat and clamping means in engagement about said element, fastener means integrally formed with said apparatus and comprising a plurality of coaxially extending shank sections for insertion through an aperture of the mounting surface and having a passageway extending axially therein and partially defined by the inner surfaces of said shank sections, and a pin element insertable in said passageway for expanding said shank section upon insertion thereof through said aperture for positively securing the clamp and fastener apparatus thereto, said pin element being positioned with respect to said clamping means so as to be positively inserted into said passageway by said clamping means upon engagement of said clamping means with said element and thereafter retained within said passageway by said clamping means when said element is seated in said seat and said seat and said clamping means are in locked engagement.

2. An apparatus according to claim 1, wherein said clamping member is further provided with a resilient retaining member biased into engagement against the seated element for securing said element against rotation and longitudinal movement relative to the seat, said resilient retaining member being resiliently deflectable for accommodating different elements throughout a predetermined range of girths.

3. An apparatus according to claim 1 or claim 2 wheren said cooperating locking means comprises a generally wedge-shaped head portion formed with one of said clamping means and said seat and a pair of similar, resiliently expandable facing shoulder members formed with the other of said clamping means and said seat and positioned to receive and snappingly engage over said wedge-shaped head portion.

4. An apparatus according to claim 1 wherein the seat comprises at least two arms for receiving and maintaining without play at least one tubular element to be attached, said seat being further provided with at least a partial collar for introducing said at least one element inside the collar, said collar being defined in the space between the free extremities of adjacent arms, the inner face of said collar substantially matching the shape of at least 50% of the outer face of said at least one element.

5. An apparatus according to claim 1 or claim 4, wherein said clamping means comprises a generally annularly configured cam having its inner face substantially matching a portion of the shape of the outer face of said at least one element and having its longitudinal axis parallel to that of the collar.

6. A molded one-piece combination safety clamp and fastener apparatus for securing to an apertured mounting surface at least one element of a predetermined shape, and comprising means defining a seat with an inner wall surface for receiving said element, clamping means integrally and hingedly coupled with said seat at a hinged connection portion to form an integral piece therewith and hingedly movable into engagement with said element when said element is seated in said seat for clampingly engaging said element, cooperating locking means associated with said seat and said clamping means respectively for positively locking the seat and clamping means in engagement about said element, fastener means integrally formed with said apparatus and comprising a plurality of coaxially extending shank sections for insertion through an aperture of the mounting surface and having a passageway extending axially therein and partially defined by the inner surfaces of said shank sections, a pin element insertable in said passageway for expanding said shank section upon insertion thereof through said aperture for positively securing the clamp and fastener apparatus thereto, said pin element being positioned with respect to said clamping means so as to be positively inserted into said passageway by said clamping means upon engagement of said clamping means with said element when said element is seated in the seat and thereafter retained within said passageway by said clamping means when said seat and said clamping means are in locked engagement, a resilient retaining member biased into engagement against the seated element for securing said element against rotation and longitudinal movement relative to the seat, said resilient retaining member being resiliently deflectable for accommodating different elements throughout a predetermined range of girths and a hook-like portion on one of said clamping means and said seat and a receiving aperture on the other of said clamping means and said seat, said hook-like portion and said receiving aperture engaging upon hinged movement of said seat and said clamping means for positively securing the hinged connection portion against disengagement.

* * * * *